US012264802B2

(12) United States Patent
Headley

(10) Patent No.: US 12,264,802 B2
(45) Date of Patent: Apr. 1, 2025

(54) APPARATUS AND SYSTEM FOR LIGHTING SHROUD SYSTEM AND METHODS THEREOF

(71) Applicant: TURF DESIGN, INC., Gilberts, IL (US)

(72) Inventor: Dustin Headley, Crystal Lake, IL (US)

( * ) Notice: Subject to any disclaimer, the term of this patent is extended or adjusted under 35 U.S.C. 154(b) by 307 days.

(21) Appl. No.: 17/885,473

(22) Filed: Aug. 10, 2022

(65) Prior Publication Data

US 2023/0049467 A1 Feb. 16, 2023

Related U.S. Application Data

(60) Provisional application No. 63/231,412, filed on Aug. 10, 2021.

(51) Int. Cl.
*F21V 1/26* (2006.01)
*F21V 21/008* (2006.01)
*G10K 11/162* (2006.01)

(52) U.S. Cl.
CPC .............. *F21V 1/26* (2013.01); *F21V 21/008* (2013.01); *G10K 11/162* (2013.01)

(58) Field of Classification Search
CPC .......... F21V 1/26; F21V 1/008; G10K 11/162
See application file for complete search history.

(56) References Cited

U.S. PATENT DOCUMENTS

| | | | | |
|---|---|---|---|---|
| 1,997,017 | A * | 4/1935 | Roeloffzen | A42C 5/02 2/184 |
| 7,048,414 | B2 * | 5/2006 | Weber | F21V 29/506 362/267 |
| 7,686,484 | B2 | 3/2010 | Heiking et al. | |
| 8,317,365 | B2 | 11/2012 | Tracy | |
| 10,770,053 | B2 * | 9/2020 | Krass | G02B 6/0081 |
| 2014/0126190 | A1 * | 5/2014 | Dixon | F21V 23/023 362/217.05 |
| 2015/0300605 | A1 * | 10/2015 | Clark | F21V 17/06 156/60 |
| 2022/0059066 | A1 * | 2/2022 | Czech | F21S 8/043 |
| 2023/0049467 | A1 * | 2/2023 | Headley | F21V 21/008 |
| 2023/0133237 | A1 * | 5/2023 | Arni | F21S 8/061 181/284 |
| 2024/0210000 | A1 * | 6/2024 | Van Bommel | G02B 6/0045 |

* cited by examiner

*Primary Examiner* — Forrest M Phillips
(74) *Attorney, Agent, or Firm* — Patrick Sheldrake

(57) ABSTRACT

A dynamic acoustic jacket device and a dynamic acoustic jacket system, that includes a single piece of material folded into acoustic jacket for covering a lighting fixture, using locking devices or the cut away portion of the device, to quickly and easily install the acoustic jacket over suspension cables so that the acoustic jacket can be lowered and raised over the lighting fixture without the need to be attached thereto.

20 Claims, 11 Drawing Sheets

APPARATUS AND SYSTEM FOR LIGHTING SHROUD SYSTEM AND METHODS THEREOF

BACKGROUND a. Technical Field

The instant disclosure relates to an acoustic cover, shroud, sleeve or jacket for partially or completely covering a lighting fixture hanging from a ceiling or ceiling structure, without the acoustic jacket being physically attached to the lighting fixture. For ease of reference, the acoustic cover, shroud, sleeve or jacket will be referred to collectively herein as a jacket, jacket device, lighting fixture jacket or simply as the device.

The instant disclosure also relates to an acoustic jacket device system, which may include some or all of the jacket device, the lighting fixture along with the support or attachment cables that allow the system components to be connected or attached to the ceiling or ceiling structure, such as a Unistrut bracket, T-Bar drop ceiling or a similar structure. The instant disclosure further relates to the methods for manufacturing the jacket device and/or installing the jacket device along with the lighting fixture without physically attaching the jacket device to the lighting fixture.

As such, once manufactured or assembled, the jacket device can be installed onto a cable suspension system (before or after the lighting fixture has been installed), configured to move up and down on the suspension cables over the lighting fixture, but not physically attached thereto. The suspension cables may be a single cable for supporting both the jacket device and the lighting fixture while also supplying electrical power to the lighting fixture. Additionally, the cable suspension system may be multiple cables for supporting the lighting fixture separately from the jacket device and separately from the electrical power cable. A combination of these systems is also contemplated in the present disclosure.

Additionally, the assembly of the jacket device may include being assembled or manufactured onto the suspension cables. However, regardless of the assembly or manufacturing procedures, the finished jacket device installed in conjunction with the lighting fixture, can be removed from or away from, or lifted above the lighting fixture without physically removing the jacket device from the suspension cables or without removing or moving the lighting fixture from its installation location. This functionality allows easy access to the lighting fixture for installation, repair and/or maintenance, such as bulb replacement or cleaning, without the necessity of completely removing the jacket device from the suspension cables and without the necessity of removing the lighting fixture from its location.

Additionally, as stated herein, the jacket device can be installed by an acoustic installer prior to the installation of the lighting fixture, which can then be installed at a later date by an electrician installer. Alternatively, the lighting fixture can be first installed by an electrician installer prior to the installation of the jacket device, which can be installed at a later date by an acoustic installer. This dual functionality solves the problem of the timing of installation of the lighting fixture and/or the jacket device, since either can be installed before the other.

The instant disclosure further relates to an acoustic jacket system, including the jacket device, lighting system and cable supports functions to facilitate the installation (lighting fixture first or jacket device first), repair and/or maintenance of the lighting fixture without completely removing the jacket from the supporting cables connecting and supporting the lighting fixture (and the jacket device). The jacket device utilized in the system may comprise a folding and locking mechanism for configuring each device that can be quickly and easily be installed onto or over the supporting cables and prior or subsequently to the installation of the lighting fixture. Once both the lighting fixture and the jacket device are properly installed, the jacket device can be lowered (or raised) over the lighting fixture without any additional attachment, thereby providing a reduction in unwanted noise and/or room acoustics.

The instant disclosure further relates to an acoustic jacket system configured using a program, such as a computer program, that utilizes the lighting fixture dimensions to calculate the correct size and location of kerfs and/or cutaways in the jacket material to optimize a predetermined design so that the jacket device can be made from a single sheet of material. The program makes the size and cutaway determination based on the dimensions of the lighting fixture entered manually or scanned automatically into the system. Once the dimensions of the lighting fixture are determined, the program calculates the jacket dimensions and determines where the proper places in the material are located for cutting and/or scoring the material. Once the cuts and scores are made, the single sheet of material can be folded and/or bent into the final jacket device shape. The final shape will include recesses or cutaways so that the resultant jacket device can be assembled over and held by the suspension cables. As such, the jacket device once created and installed over the support or suspension cables can then be lowered over the lighting fixture without being attached thereto.

The instant disclosure further relates to an acoustic jacket device that is configured using recycled polyester felt or PET Felt, and in an embodiment, and is made up of a two-dimensional configuration that can be bent and/or folded into the jacket shape. PET Felt uses a traditional 'felting' process to create its panels. This process often results in a pleasing heathered effect, where multiple tones are present in the fiber. The acoustic jacket once folded into the proper shape and location on the suspension cables can be held together with a locking device made of the same PET Felt material to retain the jacket device shape. The locking device may be a separate part or an integral part of the entire jacket device. As such, each jacket device is configured from a PET Felt sheet with pre-formed folding scores and cutouts that will receive the locking device either once the jacket has been assembled, or provide a locking device or configuration, made of the same PET Felt material. Other materials may be used for locking the device into the resultant shape and the jacket device does not have to be assembled from a single, flat piece of material as other jacket devices can be assembled from separate pieces and from different materials.

The instant disclosure incorporates by reference in their entirety U.S. Pat. No. 10,508,444, entitled Ceiling baffle apparatus and ceiling baffle system for a dynamic acoustic ceiling and methods thereof, and U.S. Pat. No. 10,584,488, entitled Apparatus and system for dynamic acoustic locking ceiling system and methods thereof, and all provisional patent applications and continuation application related thereto, including, but not limited to U.S. Provisional Patent Application Ser. No. 62/357,066, filed Jun. 30, 2016, entitled "Apparatus And System For Dynamic Acoustic Locking Ceiling System And Methods Thereof", U.S. Provisional Patent Application Ser. No. 62/357,026, filed Jun. 30, 2016, and entitled "Apparatus And System For Dynamic Acoustic Ceiling System And Methods Thereof", U.S. Provisional Patent Application Ser. No. 62/517,640, filed Jun. 9, 2017, and entitled "Ceiling Baffle Apparatus And Ceiling Baffle System For A Dynamic Acoustic Ceiling And Methods Thereof", and U.S. Provisional Patent Application Ser. No. 62/518,347, filed Jun. 12, 2017, entitled "Apparatus And System For Dynamic Acoustic Locking Ceiling System And Methods Thereof".

b. Background of Disclosure

In general terms, ceilings can be of two different types, suspended or exposed. Suspended ceilings are usually hung at a distance below the structural members to hide mechanical and electrical equipment, along with electrical conduit, HVAC ducts, water pipes, sewage lines, lighting fixtures, and similar structures. In order to construct a suspended ceiling, a metal grid is suspended from the actual ceiling, usually by wires, and acoustical or similar tiles, are inserted and supported by the grid. Depending on the type of ceiling being used, various lighting fixtures can be supported from the ceiling using suspension cables or other suspension devices, which may also provide electricity to the lighting fixture for power needs.

Although there are many types of lighting fixtures for commercial and retail settings, there are options that have become standard because they offer superior illumination, long-lasting performance, and are easy to install and maintain. The most popular options are commercial wrap lights and suspended lights, which are both great for commercial and retail settings because their linear prism design maximizes light while lowering electricity costs. With designs that feature closed structure along the sides of the lens for optimal distribution of light, these lights are great for illumination without the glare.

These different types of lighting and lighting fixtures are ideal for large spaces when installed in enclosed ceilings or when hung from the ceiling or ceiling structure. The amount of light provided and energy-saving design makes them great for a variety of settings, including commercial and retail settings, government facilities, hospitals, military bases, educational locations, and many more.

Quite often, lighting fixtures are incorporated into the ceiling designs or suspended from the ceiling or ceiling structure using support or suspension cables. These support cables also provide electrical power when necessary to power the lighting fixtures. In many instances, the lighting fixtures are made of metal or another material that creates unwanted acoustic issues and may clash with the existing ceiling baffle design, which for acoustic purposes maybe made from felt or PET-Felt materials. To rectify the situation, a felt or PET Felt material may be adhered, glued or otherwise attached to the outer wall of the lighting fixture thereby reducing the unwanted acoustics and matching or complementing the outside of the lighting fixture with the baffle design. However, the external layer of felt or PET Felt may be problematic when the lighting fixture needs to be accessed for installation, maintenance or cleaning. At that time, the external covering may have to be removed, which can take time and may even destroy the underlying lighting fixture.

Additionally, it is difficult to create and install multiple different lighting fixture covers especially when each cover needs to be adhered or attached to the lighting fixture, whether by gluing the cover in place or by screwing the material directly to the lighting fixture. An example of a cover for a light fixture is the Ceiling-Mounted TrotTer-Type Light Fixture disclosed and claimed in U.S. Pat. No. 7,686,484, to Heiking et al., which discloses a ceiling-mounted troffer-type light fixture for illumination. The fixture comprises a body with a first flange having at least one hook-receiving opening and a second flange with a suspension-member-receiving opening. A cover includes a rectangular frame, at least one catch-arm and at least one suspension member. Frame fasteners along the frame engage the perimeter in a closed position. One-person attaching/closing and removal of the cover for maintenance is facilitated by the cover being supported in an open position, suspended position and fully engaged with the body in a closed position.

Another example of a light fixture cover is the Light Fixture Cover System and Method disclosed and claimed in U.S. Pat. No. 7,048,414, to Weber, which discloses a light fixture cover system and method in which the selectively detachable cover is also a unitary structure including a body having a peripheral sealing lip that fits over any corresponding industry standard outside light fixture. The sealing lip of the cover has at least one laterally extending tab member to assist in removing the cover from the fixture. The cover portion is preferably made from a resilient polymeric material suitable for both winter and summer weather conditions in addition to being impervious to the heat generated by the electrical bulb or bulbs contained it the light fixture decorative structure, which may be curved, suspended within a space and which includes a panel fastened to a support structure by a clip, a portion of which extends along a face of the panel.

Yet another example of a light fixture cover is the Fluorescent Bulb Cover disclosed and claimed in U.S. Pat. No. 8,317,365, to Tracy et al., which discloses a cover for a compact fluorescent light employing a two piece clamshell shape assimilating a conventional incandescent light bulb. The cover is formed from two clamshells hingedly secured along a top end having inter-engaging means for securing one clamshell to a second clamshell tightly securing the cover to the base of a compact fluorescent light. In the preferred embodiment, the housing is made of material to reduce or eliminate ultraviolet light produced from a gas discharge lamp and provide a cover that can be decorative through the emulation of a conventional incandescent light bulb or decorated with colors and materials wherein the fluorescent light provides back lighting or where images are placed upon the housing so as to allow the back lighting to operate as a projection surface placing images on a wall separate from the light bulb.

These examples utilize additional supports, attachment hardware and clips to attach the covers in some way to the particular lighting fixtures. In doing so, each of these examples at a minimum, necessitate tools to assemble the structure and/or to suspend the structure to the lighting fixture thereby increasing the difficulty for accessing the lighting fixture for installation, repair and/or maintenance of the lighting fixture.

As such there is a need for an acoustic jacket for partially or completely covering a lighting fixture hanging from a ceiling or ceiling structure, without the acoustic jacket being physically attached to the lighting fixture and that can be quickly and easily removed from or moved above and away from the existing lighting fixture for installation, repair and/or maintenance of the lighting fixture, without the need for tools, separate attachment devices, clips or the like. There is also a need for a dynamic acoustic ceiling system that is an aesthetically pleasing image, and that reduces unwanted noise or room acoustics.

The foregoing is intended only to illustrate the present technical field and background art and should not be taken as a limitation or disavowal of claim scope.

BRIEF SUMMARY

The present disclosure relates to an improved acoustic jacket for partially or completely covering a lighting fixture, without physically attaching the acoustic jacket to the lighting fixture. The present disclosure relates to an acoustic jacket device that is assembled and installed to cover the lighting fixture without the need to be attached, thereby facilitating and simplifying the installation, maintenance and repair of the lighting fixture without the need to completely remove the acoustic jacket from the lighting system. The present disclosure also relates to the acoustic jacket system and the methods of manufacturing and installing the jacket and jacket system.

An object of the present disclosure is an improved acoustic cover, shroud, sleeve or jacket for partially or completely covering a lighting fixture hanging from a ceiling or ceiling structure, without the acoustic jacket being physically attached to the lighting fixture. The present disclosure also relates to an acoustic jacket device system that allows the system components to be connected or attached to the ceiling or ceiling structure. The instant disclosure further relates to the methods for manufacturing and/or assembling the jacket device and installing the jacket device along with the lighting fixture without physically attaching the jacket device to the lighting fixture.

Another object of the present disclosure is that once assembled, the jacket device can be installed onto a cable suspension system and configured to move up and down the suspension cables and be located over the lighting fixture. The jacket device will not be physically attached to the lighting fixture so that it can be removed from or lifted above the lighting fixture without physically removing the jacket device from the suspension cables, or without removing the lighting fixture from its original location. This allows easy access to the lighting fixture for installation, repair and/or maintenance, without the necessity of completely removing the jacket device from the suspension cables and without the necessity of removing the lighting fixture from its location.

It is a further object of the present disclosure that the jacket device can be installed by an acoustic installer prior to the installation of the lighting fixture, which can then be installed at a later date by an electrician installer. Alternatively, it is an object of the present disclosure that the lighting fixture can be first installed by an electrician installer prior to the installation of the jacket device, which can be installed at a later date by an acoustic installer, thereby solving any timing issues for installation of the lighting fixture and/or the jacket device, since either can be installed before the other.

A further object of the present disclosure is an acoustic jacket system, including one or more of the jacket device, lighting fixture and suspension cable or supports to facilitate the installation, repair and/or maintenance of the lighting fixture without completely removing the jacket from the supporting cables connecting and supporting the lighting fixture and the jacket device. An object of the present disclosure is a jacket device utilized in the system that may comprise a folding and locking mechanism for configuring each jacket device and that can be quickly and easily installed onto or over the supporting cables. Once both the lighting fixture and the jacket device are properly installed, the jacket device can be lowered or raised over the lighting fixture without any additional attachment, thereby providing a reduction in unwanted noise and/or room acoustics.

It is a further objective of the present disclosure that the acoustic jacket system is configured using a computer program, that utilizes the lighting fixture dimensions to calculate the correct size and location of cuts, kerfs and/or cutaways in the jacket material, based on the dimensions of the lighting fixture, to optimize a predetermined design so that the jacket device can be made from a single sheet of material. Once the material is cut and scored, the single sheet of material can be folded and/or bent into the final jacket device shape, which will include recesses or cutaways so that the jacket device can be assembled over and held by the suspension cables, and then lowered over or raised above the lighting fixture, without being attached thereto.

It is a further object of the present disclosure that the acoustic jacket device that is configured using recycled polyester felt or PET Felt, and in an embodiment, and is made up of a two-dimensional configuration that can be bent and/or folded into the jacket shape. The jacket once folded into the proper shape and location on the suspension cables can be held together with a locking device made of the same PET Felt material to retain the jacket device shape. The locking device may be a separate part or an integral part of the entire jacket device. Other materials can be used for locking the device into the resultant shape and the jacket device does not have to be assembled from a single, flat piece of material as other jacket devices can be assembled from separate pieces and from different materials.

Additional objectives and advantages of the present disclosure will become apparent to one having ordinary skill in the art after reading the specification in light of the drawing figures, however, the spirit and scope of the present invention should not be limited to the description of the embodiments contained herein.

DETAILED DESCRIPTION

As stated herein, the objective of the present disclosure is to provide an improved acoustic jacket device, system and method for removeably covering a lighting fixture to facilitate installation, repair and maintenance of the lighting fixture by removing or lifting the jacket device away from the lighting fixture.

Figure 11:
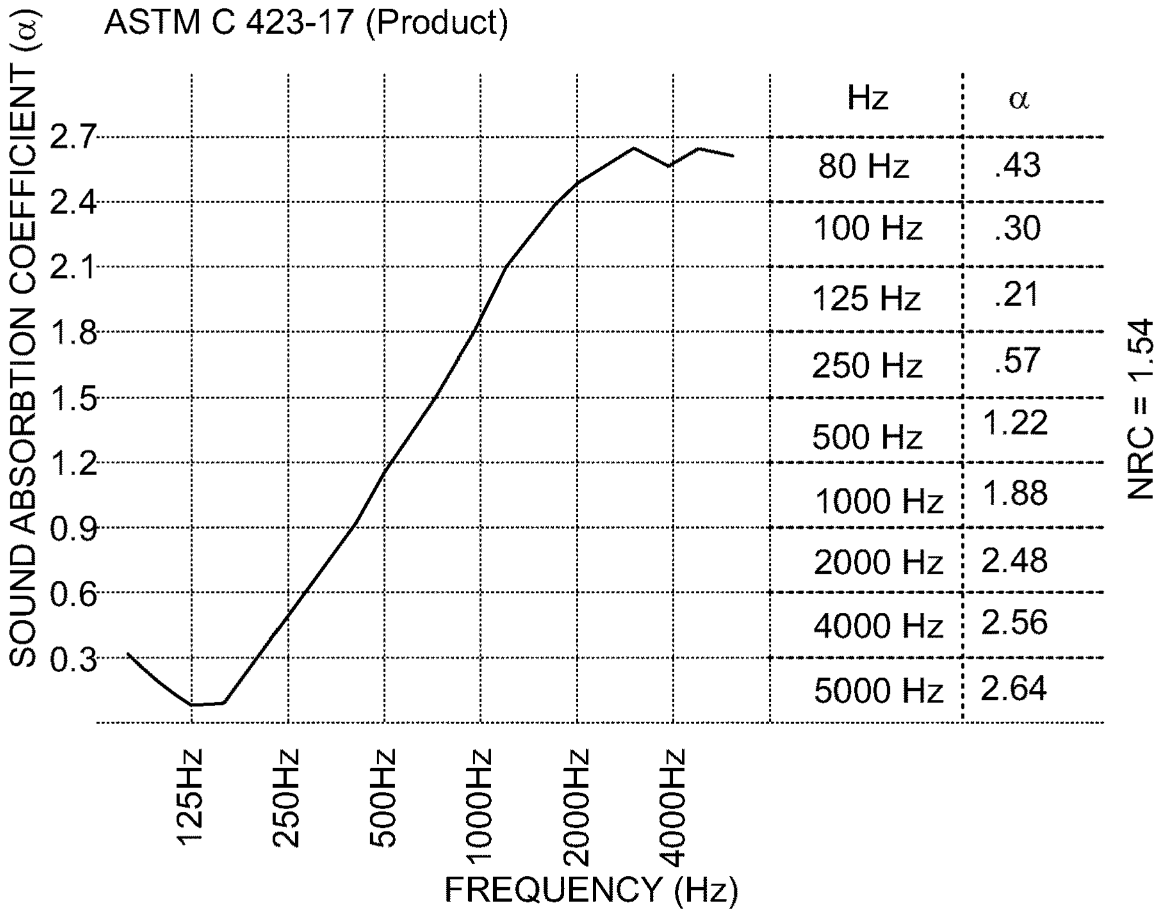
FIG. 11 is a graph of the acoustic testing in accordance with ASTM C 423-17 (product) of the ceiling baffles in accordance with the present disclosure.

Referring to the drawings, wherein like reference numerals refer to the same or similar features in the various views, FIGS. 1 through 9 show different views of the improved jacket device 10, with FIG. 6 also showing an exemplary locking device and FIG. 11 showing a flowchart for the computer program used to calculate the cutouts and scoring for the acoustic jacket device and system.

Figure 1:
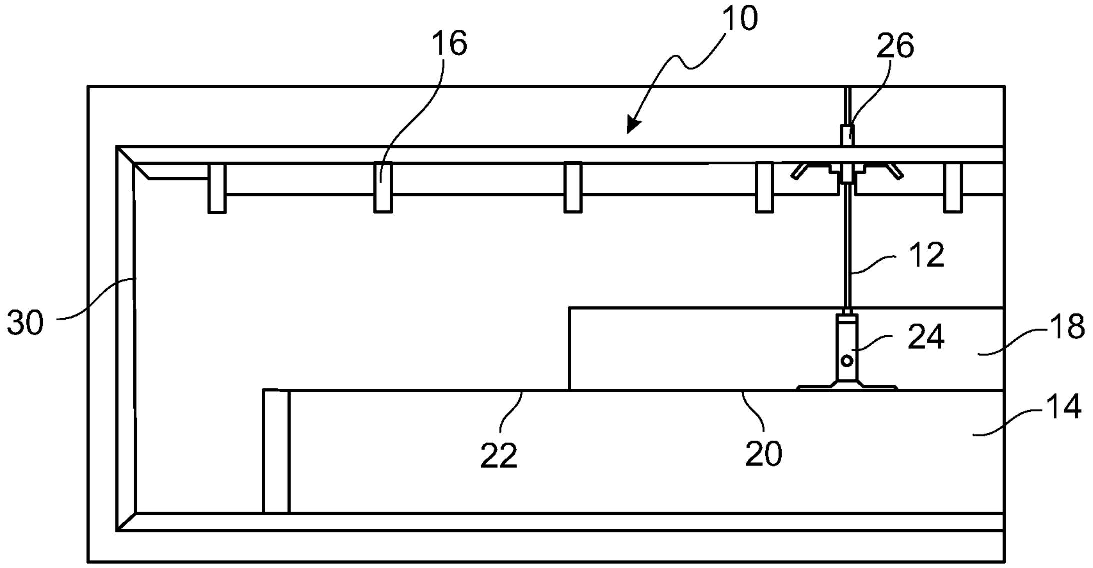
FIG. 1 is a front view of a portion of an acoustic jacket system comprising an acoustic jacket device over a lighting fixture with suspension cable in accordance with the present disclosure.

FIG. 1 shows a close-up transparent section of the resulting acoustic jacket 10 after being folded, assembled or manufactured into the resultant or resulting shape over the suspension cables 12 and lowered into position over the lighting fixture 14. The acoustic jacket 10 along with the lighting fixture 14 and components needed to attach and secure the devices can be referred to as the acoustic jacket system 200. Throughout this disclosure, the acoustic jacket 10 may be referred to either by itself or with the lighting fixture 14, but the system 200 is meant to include all components.

The folding or assembly of the acoustic jacket 10 allows the resulting acoustic jacket 10 to be assembled or folded to encompass, incorporate or cover the suspension cables 12 as described herein. Also shown in FIG. 1 is a side view of the locking devices 16, at the top of the jacket 10 that are used to hold the jacket 10 in its shape after folding or assembly.

The jacket device 10 also comprises a lighting fixture stopper 18 that is used to stop and position the jacket properly over the lighting fixture 10, when the jacket 10 is lowered over and on to the lighting fixture 14. The bottom 20 of the lighting fixture stopper 18 comes in contact with the top 22 of the lighting fixture 14 for proper placement. This allows the acoustic jacket 10 to remain in place over the lighting fixture 14 without the need to be physically attached to the lighting fixture 14.

The jacket device 10, which is made in the preferred embodiment, from a single sheet of 9 mm polyester felt or PET Felt, and is intended to be folded into a rectangular or a slab shape to cover a rectangular lighting fixture 14. The lighting fixture also includes structural supports 24 that are attached to the suspension cable 12 to hold the lighting fixture as understood by one having ordinary skill in the art. In the preferred embodiment, the structural support 24 prevents the acoustic jacket device 10 from moving up and down the suspension cable 12. The acoustic jacket device 10 includes cable grippers 26 to hold the acoustic device 10 in place above the lighting fixture 14 when installation, repair or maintenance is being performed on the lighting fixture 14. Once the acoustic jacket device 10 is lifted above and away from the lighting fixture 10, the cable grippers 26 can be used to grip the suspension cables 12 and hold the jacket device 10 above and away from the lighting fixture 10.

Additionally, cable grippers 26 can be used instead of or along with the lighting fixture stopper 18 to hold the acoustic jacket device 10 in the proper location in use. In the instance of only using one or more cable grippers 26, once the acoustic jacket 10 is lowered to the proper location, one or more cable grippers 26 can be tightened to hold the jacket device 10 in place.

Also, depending on the lighting fixture 14 design and the acoustic jacket 10 design, there may be no need for either one or more lighting fixture stoppers 18 or cable grippers 26 as the acoustic jacket 10 may sit exactly in place over the lighting fixture 14. However, in this scenario, there must be a way to hold the jacket device 10 in place over the lighting fixture 14 when installation, repair or maintenance is being performed.

For instance, the jacket device 10 can be lifted up and away from the lighting fixture 14 and cable grippers 26 or another device can be attached to the suspension cables 12 below the acoustic jacket 10 so that the acoustic jacket 10 will be prevented from sliding down the suspension cables 12. The cable grippers 26 or other device will act to hold the jacket device 10 in place above the lighting fixture 14 while installation, repair or maintenance takes place. Then, once complete, the acoustic jacket 10 can be lifted up higher to access the cable grippers 26 or other device, which can be removed, allowing the acoustic jacket 10 to slide down the suspension cables 26 and in to the proper location over the lighting fixture 14. Other ways can be incorporated to hold the acoustic jacket 10 in place above and away from the lighting fixture 14, when needed.

Although a rectangular lighting fixture 14 is used in the preferred embodiment, any shape lighting fixture 14 can be used as discussed further herein. The shape of the lighting fixture 10 will determine the shape of the jacket device 10. A computer program or software program can be used to incorporate the lighting fixture 10 design into the design of the acoustic jacket 10. The software program can incorporate the lighting fixture 10 design to calculate or determine the design of the acoustic jacket 10 so that the acoustic jacket 10 can be assembled or folded from a single sheet of flat material (not shown), with integrated or separate locking devices to hold the acoustic jacket 10 in its folded position. Additionally, the jacket device 10 does not have to be made from a single sheet of flat material, and can be assembled from different materials to form the jacket device 10.

Figure 2A:
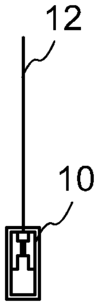
FIG. 2A is a side view of an acoustic jacket system comprising an acoustic jacket device covering a lighting fixture with suspension cable in accordance with the present disclosure.
Figure 2B:
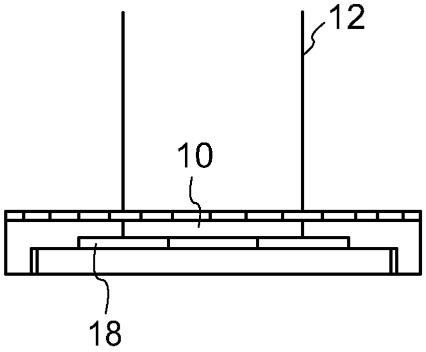
FIG. 2B is a front view of an acoustic jacket system comprising an acoustic jacket device covering a lighting fixture with suspension cable in accordance with the present disclosure.
Figure 3A:
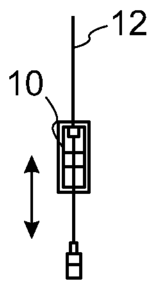
FIG. 3A is a side view of an acoustic jacket system comprising an acoustic jacket device lifted above a lighting fixture with suspension cable in accordance with the present disclosure.
Figure 3B:
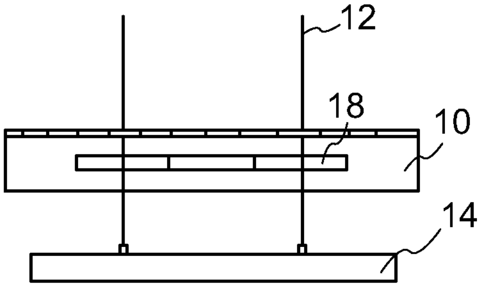
FIG. 3B is a front view of an acoustic jacket system comprising an acoustic jacket device lifted above a lighting fixture with suspension cable in accordance with the present disclosure.

FIGS. 2A and 2B show a side view and front view, respectively, of the acoustic jacket 10 after it has been folded or assembled and dropped or lowered into position over the lighting fixture 14. FIGS. 3A and 3B show a side view and front view, respectively, of the acoustic jacket 10 after it has been folded or assembled and lifted or raised up into position away from the lighting fixture 14. The view in these four figures (and in FIG. 1) are transparent to show the inside of the acoustic jacket 10 and to facilitate an explanation of the relationship between the various components of the acoustic jacket 10 and the lighting fixture 14. Both the acoustic jacket 10 and the lighting fixture 14 are supported by the suspension cables 12. The locking devices 16 are visible in FIGS. 1, 2A, 2B, 3A and 3B, although they would not be visible except from the top view as seen in FIGS. 4A and 4B.

Figure 4A:
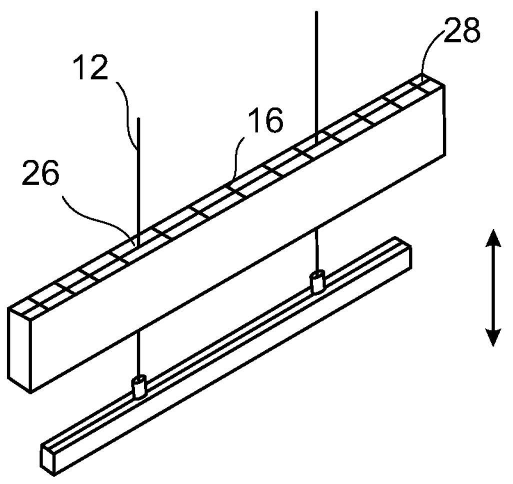
FIG. 4A is a top perspective view of an acoustic jacket system comprising an acoustic jacket device lifted above a lighting fixture with suspension cable in accordance with the present disclosure.
Figure 4B:
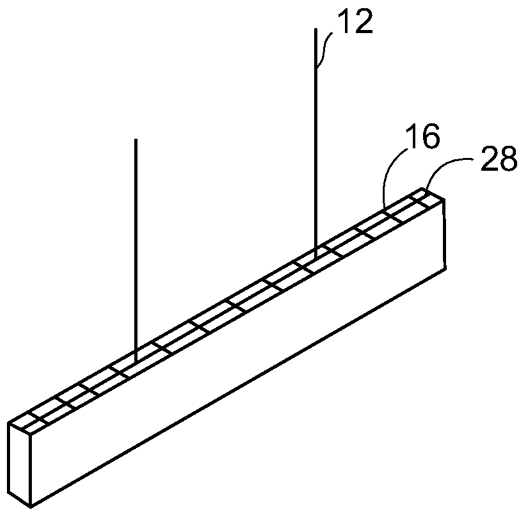
FIG. 4B is a top perspective view of an acoustic jacket system comprising an acoustic jacket device covering a lighting fixture with suspension cable in accordance with the present disclosure.
Figure 5A:
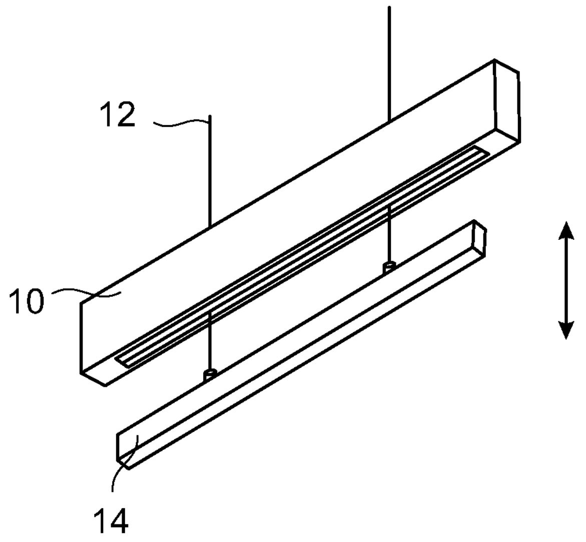
FIG. 5A is a bottom perspective view of an acoustic jacket system comprising an acoustic jacket device lifted above a lighting fixture with suspension cable in accordance with the present disclosure.
Figure 5B:
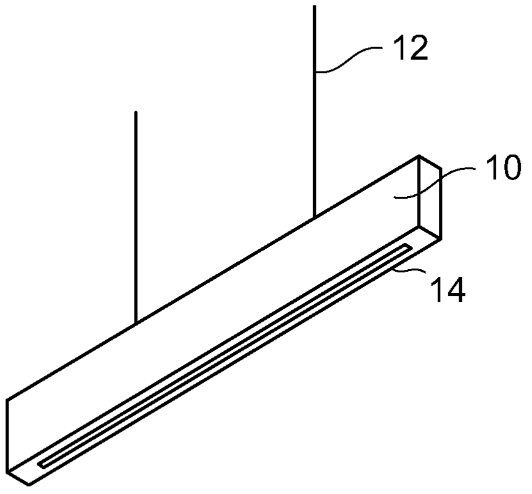
FIG. 5B is a bottom perspective view of an acoustic jacket system comprising an acoustic jacket device covering a lighting fixture with suspension cable in accordance with the present disclosure.

FIGS. 4A and 4B show top perspective views of the acoustic jacket 10 after it has been folded or assembled and before (FIG. 4A) it is dropped or lowered into position over the lighting fixture 14, and after (FIG. 4B) it is dropped or lowered into position over the lighting fixture 14. FIGS. 5A and 5B show bottom perspective views of the acoustic jacket 10 after it has been folded or assembled and before (FIG. 5A) it is dropped or lowered into position over the lighting fixture 14, and after (FIG. 5B) it is dropped or lowered into position over the lighting fixture 14. These figures provide additional detail to the acoustic jacket device 10 after it has been folded, assembled or manufactured, and hides the internal features as shown in FIGS. 1, 2A, 2B, 3A and 3B. From the top, the locking devices 16 are still visible, but the lighting fixture stopper 16, the bottom 20 of the lighting fixture stopper 18, and the lighting fixture structural support 24 are no longer visible. Again, both the acoustic jacket 10 and the lighting fixture 14 are supported by the suspension cables 12, and to the extent used, the one or more cable grippers 26 are visible.

As described above, the acoustic jacket device 10 can be folded or assembled from a single piece of material, pre-scored for easy folding, which may have various cutouts for the different shapes of the acoustic jacket 10 and to incorporate other functions, such as lighting fixture stopper 18 and the locking device 16 as described herein. As such, prior to being constructed into its resulting shape, the unfolded or flat jacket device 10 may be made from recycled polyester felt or PET Felt, although other materials may be used for the design. Additionally, the acoustic jacket 10 can be made from multiple sheets of the same or different materials.

As disclosed herein, there are numerous acoustic jacket 10 designs and shapes that can be constructed in accordance with the present disclosure. The sections of the jacket device 10 that will accept the locking device 16 are located such that when the ends 28 of the unfolded sheet of material are folded at the score lines 30, the locking devices 16 can be inserted into preformed holes 32, thereby holding the jacket device 10 in the resulting shape. This configuration allows the acoustic jacket device 10 to be transported flat and easily assembled, folded or manufactured at the installation site, thereby reducing shipping costs.

The acoustic jacket device 10 will also be manufactured to provide one or more preformed cable holes 34 for allowing the suspension cables 12 to be incorporated or captured by the jacket device 10 when it is folded or assembled into it resulting shape. As such, the unfolded material will be folded around the suspension cables 12 thereby allowing the jacket device 10 to slide up and down on the suspension cables up to the top near the ceiling and down to the lighting fixture 14. As described herein, the acoustic jacket device 10 can be stopped on the suspension cables 12 using the cable grippers 26 (among other ways), and the jacket device 10 will be prevented from sliding past the lighting fixture 14 by the lighting fixture stopper 18 (among other ways).

Further, the ends 28 of material can be configured to lock into or dove tail into each other in an integrated manner thereby obviating the need for a locking device 16. Other locking devices 16 and additional end 28 of material designs can be incorporated to function to hold the resulting acoustic jacket 10 in the proper shape.

Figure 6A:
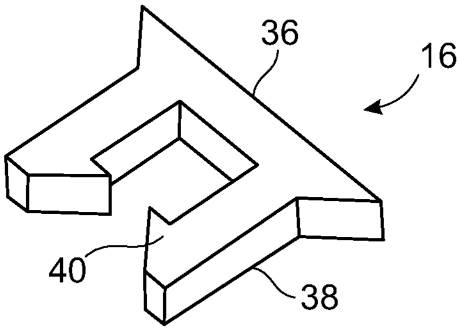
FIG. 6A is a front facing view of a locking device in accordance with the present disclosure.

FIG. 6A shows an enlarged drawing of an exemplary locking device 16, which is one example used to hold the acoustic jacket 10 in the resulting shape. The locking device 16 in the preferred embodiment is also made of PET Felt and is sized and shaped to be inserted into the preformed holes 32 at one or more insert locations. In the exemplary figure, five locking devices 16 are used to hold the acoustic jacket 10 in the folded position. The locking devices 16 have a top portion 36 that can be seen from the top of the acoustic jacket 10 once folded or assembled, a side portion 38, and an arrow shaped hook or edge portion 40 that, once the locking device 16 is completely inserted into the preformed holes 32, will lock the locking device 16 in place. Other shaped and sized locking devices 16 can be used to hold the acoustic jacket 10 in the folded position.

As described below, the sides of the acoustic jacket 10 can be pre-formed to lock into itself with a first side comprising a male/female cutout to connect with a male/female cutout on the second side. Once interlocked or connected like the pieces of a puzzle, the acoustic jacket 10 (completely folded) will enclose the lighting fixture 14, but still allow for the acoustic jacket 10 to be lifted on its suspension cables 12 to access the lighting fixture 14 without the acoustic jacket 10 in the way.

Once folded, the locking devices 16 will hold the jacket device 10 in its desired (lighting fixture 14 cover) shape. The dimensions of the locking device 16 will depend on the lighting fixture 14 design, but in the preferred embodiment, the arrow shaped hook portion 40 of the locking device 16 is at 30 degrees to assist in holding the acoustic jacket 10 together while resisting removal from the inserted locations (although it can be removed as necessary with enough force). Additionally, as detailed herein, the locking device 16 may be integrated into or with the ends 28 of the material so that the jacket device 10 can merely be folded and locked into place without a separate locking device 16.

Different sized and shaped locking devices 16 for holding the acoustic jacket 10 in its folded position can be created depending on need, based on the size and shape of the lighting fixture 14. Further, FIG. 4A for example shows 13 locking devices 16, however, each acoustic baffle 10 can be configured with more or less locking devices 16 depending on the need, and based on the configuration of the lighting fixture 14.

Figure 6B:
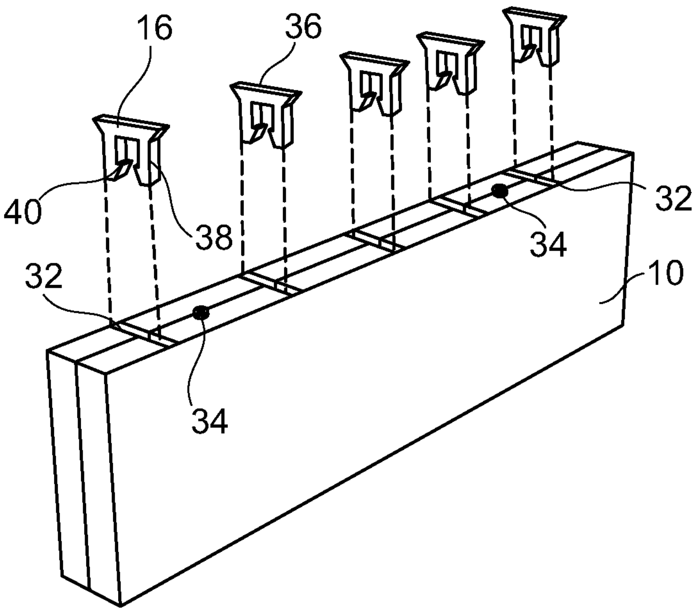
FIG. 6B is a top perspective view of an acoustic jacket system comprising an acoustic jacket device with locking devices in accordance with the present disclosure.

FIG. 6B shows a top perspective view of the acoustic jacket 10 after it has been folded or assembled and before the locking devices 16 are inserted into the preformed holes 32. The preformed cable holes 34 will be used to enclose and capture the suspension cables 12 not shown in this figure. As the locking devices 16 are lowered into place in the folded acoustic jacket 10, the side portion 38 will be forced away from the center to allow the hook portion 40 to fit into the preformed holes 32, with each locking device hook portion 40 catching the side of each of the preformed holes 32 thereby locking the acoustic jacket 10 in its folded shape as shown in FIGS. 4A and 4B. Using this method, the acoustic jacket 10 can be folded from a single piece of material, although a single piece of material is not necessary.

Figure 7:
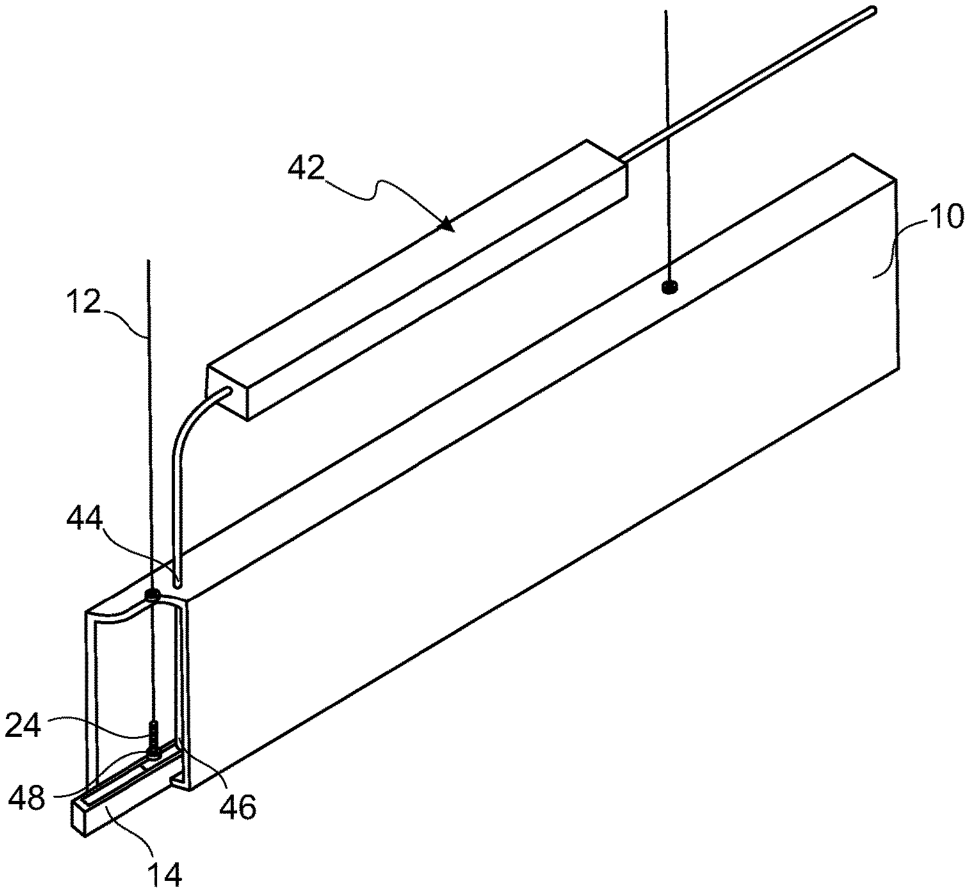
FIG. 7 is a top perspective view of an acoustic jacket system comprising an acoustic jacket device with locking devices in accordance with the present disclosure.

FIG. 7 shows an example of a finished acoustic jacket 10 with a cut away portion to show the internal suspension cable 12 and lighting fixture 14. The power supply or driver box 42, in this example, uses a separate entry 44 into the folded acoustic jacket 10 to access and power the lighting fixture 14 at lighting fixture power entry 46. In this example, the structural support 24 to the lighting fixture 14 is the embedded cable gripper option 48. Other options, such as the threaded connection option 50 (see FIG. 10), can be used to attach the suspension cables 12 to the lighting fixture 14.

Figure 8A:
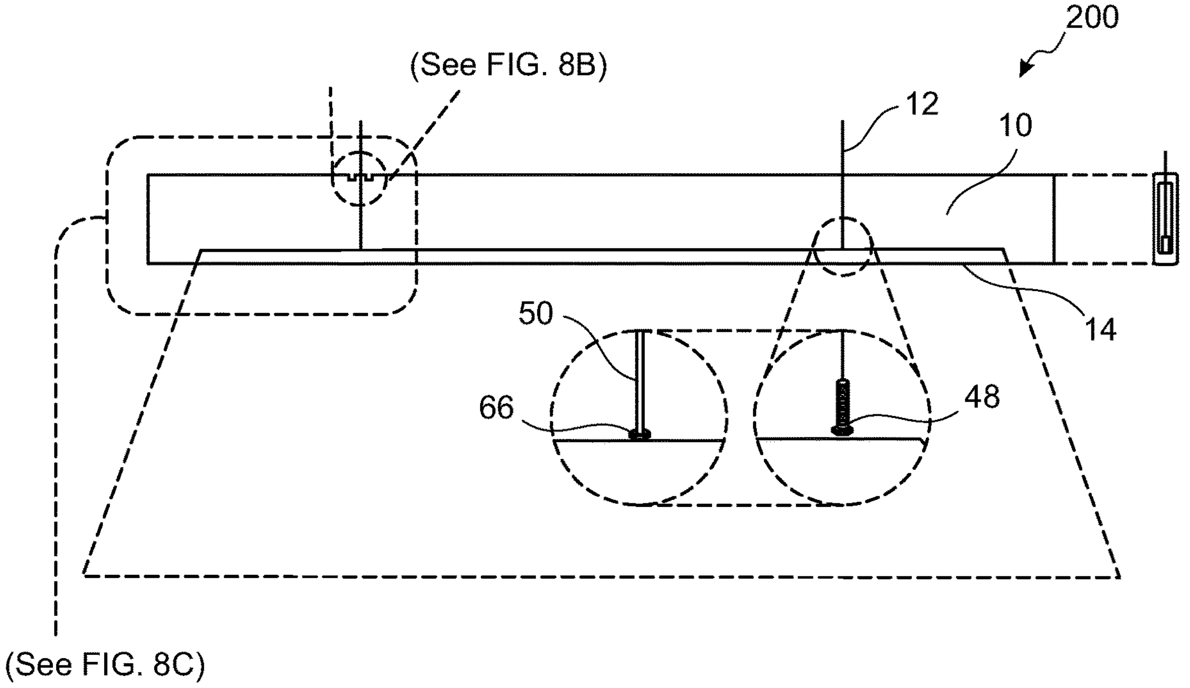
FIG. 8A is a side view of an acoustic jacket system comprising an acoustic jacket device with locking devices in accordance with the present disclosure.

FIGS. 8A through 8D show features and options of the acoustic jacket 10 and the acoustic jacket system 200, which as described herein includes the acoustic jacket 10 and the lighting fixture 14, along with other components and options. FIG. 8A shows front and side views of the acoustic jacket 10 and the lighting fixture 14 with the suspension cables 12.

Figure 8B:
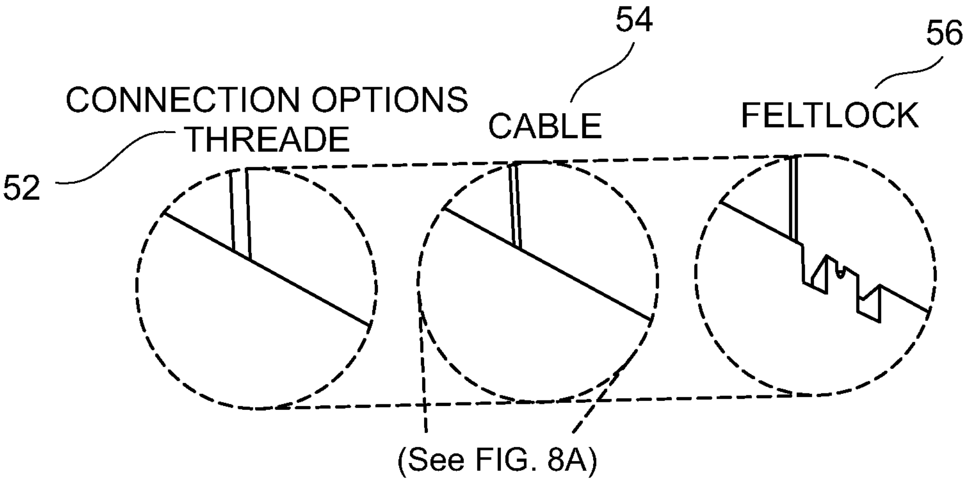
FIG. 8B is a partial perspective view of the connection options for the acoustic jacket system comprising an acoustic jacket device with locking devices in accordance with the present disclosure.

FIG. 8B shows the three different connection options for connecting the acoustic jacket system 200 to the ceiling. As described herein, the acoustic jacket system 200 uses suspension cables 12, structural supports 24, cable grippers 26, attachment devices 48, 50, and connection options 52, 54, 56, among others, that allow for connection or attachment of the acoustic jacket 10 and lighting fixture 14 to the ceiling or ceiling structure, such as a Unistrut bracket, T-Bar drop ceiling or a similar structure. The connection options include, but are not limited to, a threaded connection 52, a cable connection 54 and a PET Felt connection 56, that can be cut into the edges of the acoustic jacket 10 and used to attach the acoustic jacket 10 to a standard ceiling Unistrut bracket, as shown herein. Other attachment devices can be used to realize the same functionality.

Figure 8C:
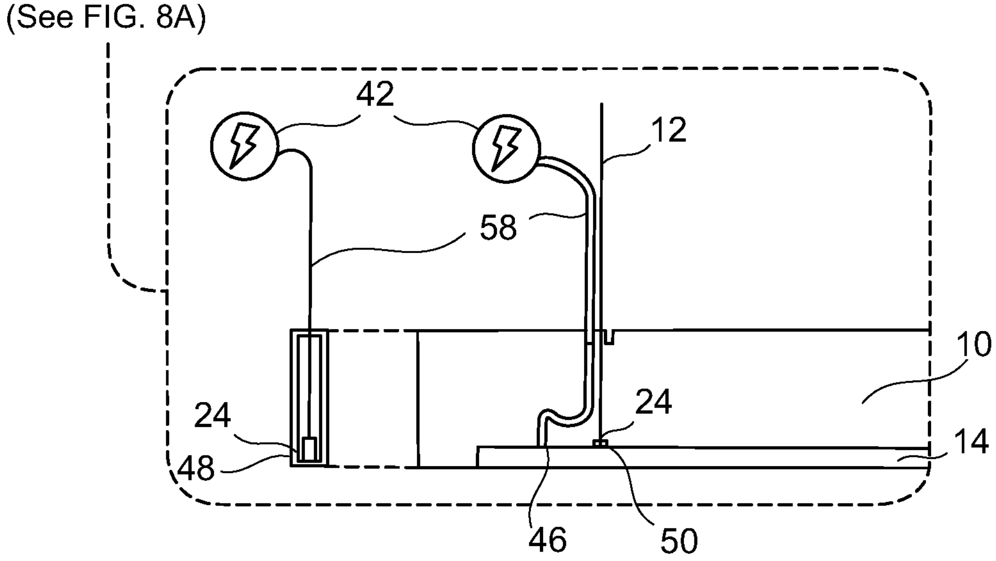
FIG. 8C is a partial perspective view of the power connection options for the acoustic jacket system comprising an acoustic jacket device with locking devices in accordance with the present disclosure.

FIG. 8C shows the power cord 58 coming from the driver box 42 and entering the lighting fixture 14 at the lighting fixture entry 46. As disclosed herein, the structural support 24 to the lighting fixture 14 can be realized using the embedded cable gripper option 48, or the threaded connection option 50. Other structural supports can be used.

Figure 8D:
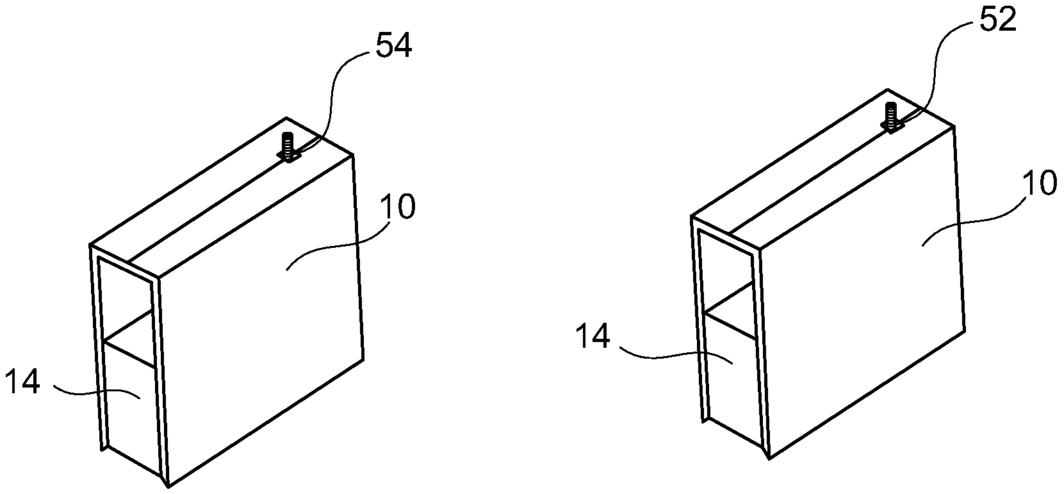
FIG. 8D is a top perspective view of an acoustic jacket system comprising an acoustic jacket device with connection type options in accordance with the present disclosure.

FIG. 8D shows another view of the connection types for securing the acoustic jacket 10 to the suspension cables 12. Shown are two of the three options (there are others), disclosed herein, including the threaded connection 52, and the cable connection 54 (suspension cables 12 not shown for clarity purposes). These connection types will allow the acoustic jacket 10 to be simply attached to a ceiling using the suspension cable 12.

Figure 9:
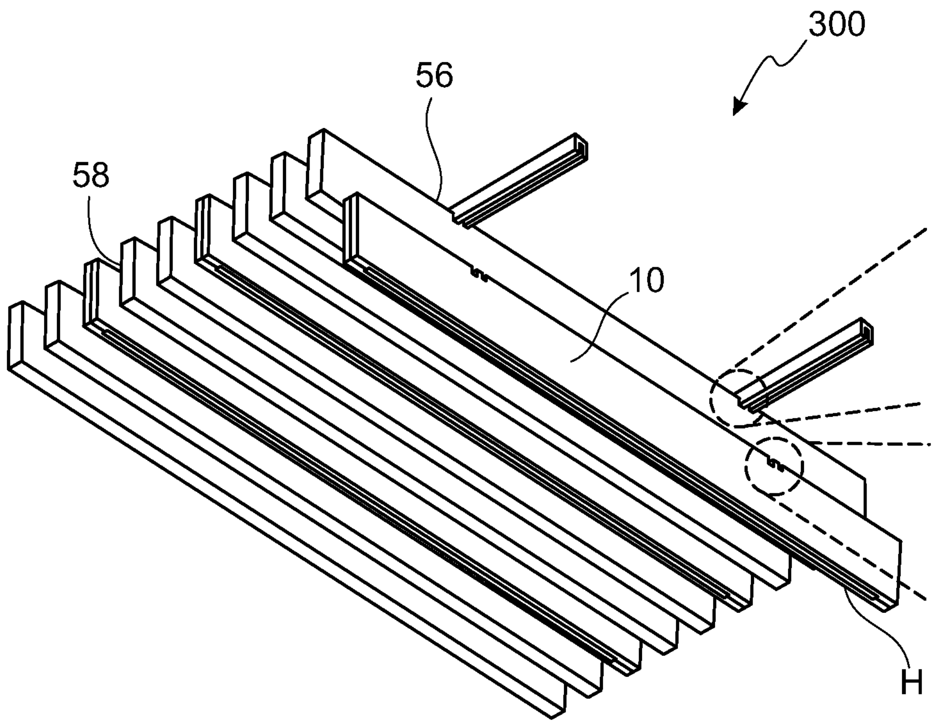
FIG. 9 is a lower perspective view of an acoustic jacket system comprising both acoustic jacket devices with LED lighting and acoustic baffles without LED lighting in accordance with the present disclosure.

FIG. 9 shows another view of the instant disclosure but from a different perspective. FIG. 9 shows a ground up perspective view of the acoustic jacket system 200 comprising acoustic jackets 10 with the LED lighting fixtures 14 in some of the ceiling baffles. Other acoustic ceiling baffles without LED lighting 310 can be included into a larger ceiling system 300 depending on the needs of the user, and still be in accordance with the present disclosure.

Figure 10:
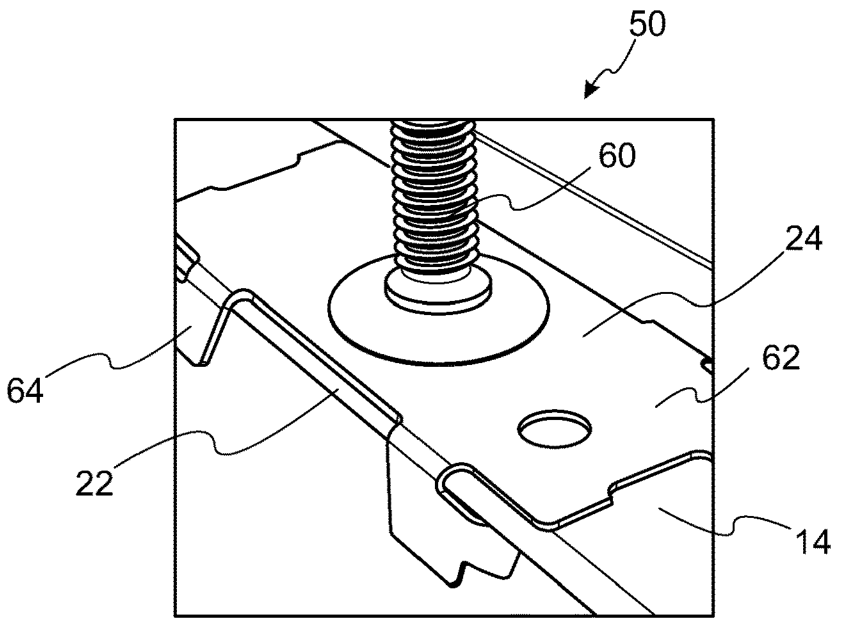
FIG. 10 is a partial perspective view of the threaded connection option after being attached to a lighting fixture for the acoustic jacket system in accordance with the present disclosure.

FIG. 10 shows a close up of one of the structural supports 24 that attach to and support the lighting fixture 14 and hold it in place. In this example, the structural support 24 is the threaded attachment 50 that includes an embedded %-20 threaded post 60 connected to a threaded attachment plane 62 that utilizes one or more (in this case four) threaded attachment supports 64 for gripping the top 22 of the lighting fixture 14. Once attached to the top 22 of the lighting fixture 14 by use of the threaded attachment supports 64, the threaded post 60 is positioned and can be used to attach the lighting fixture 14 to the suspension cable 12 using a nut 66 or similar attachment device at the end of the suspension cable 12.

As described herein, the material used in the preferred embodiment is polyester felt and is 99% recycled. The material used in the preferred embodiment are 9 mm thick, although other sizes and textures, such as wood, can be used. The maintenance of the product includes occasional vacuuming to remove particulate matter and air-borne debris or dust. Compressed air can be used to dust off the material in difficult to reach areas and for large assemblies.

The felt comes in numerous colors, including white, cream, light grey, light brown, brown, matte grey, charcoal, black, yellow, mango, orange, red, lavender, lime, green, light blue and dark blue. Of course, the jacket devices 10 can be manufactured in many other colors and textures, including wood, and the present disclosure is not limited to these specifications and colors, as these are merely the specifications and colors for the preferred embodiments and alternative embodiments.

The acoustic testing standard ASTM C 423-17 for the ceiling baffles provides results of the sound absorption coefficient for a ceiling baffle at various frequencies. The test arrangement used a +100 mm air layer filled with 50 mm rock wool board. As shown in FIG. 11, the sound absorption coefficient at 250 Hz 70 is 0.57 72, at 500 Hz 74 it is 0.76 76, at 1000 Hz 78 is 1.00 80, and at 2000 Hz 82 is 0.76 84.

FIG. 11 also shows the graph 86 of the sound absorption coefficient against frequency for the same test, with a noise reduction coefficient (NRC) 88 of 1.54 for the acoustic jacket system 200.

Figure 12:
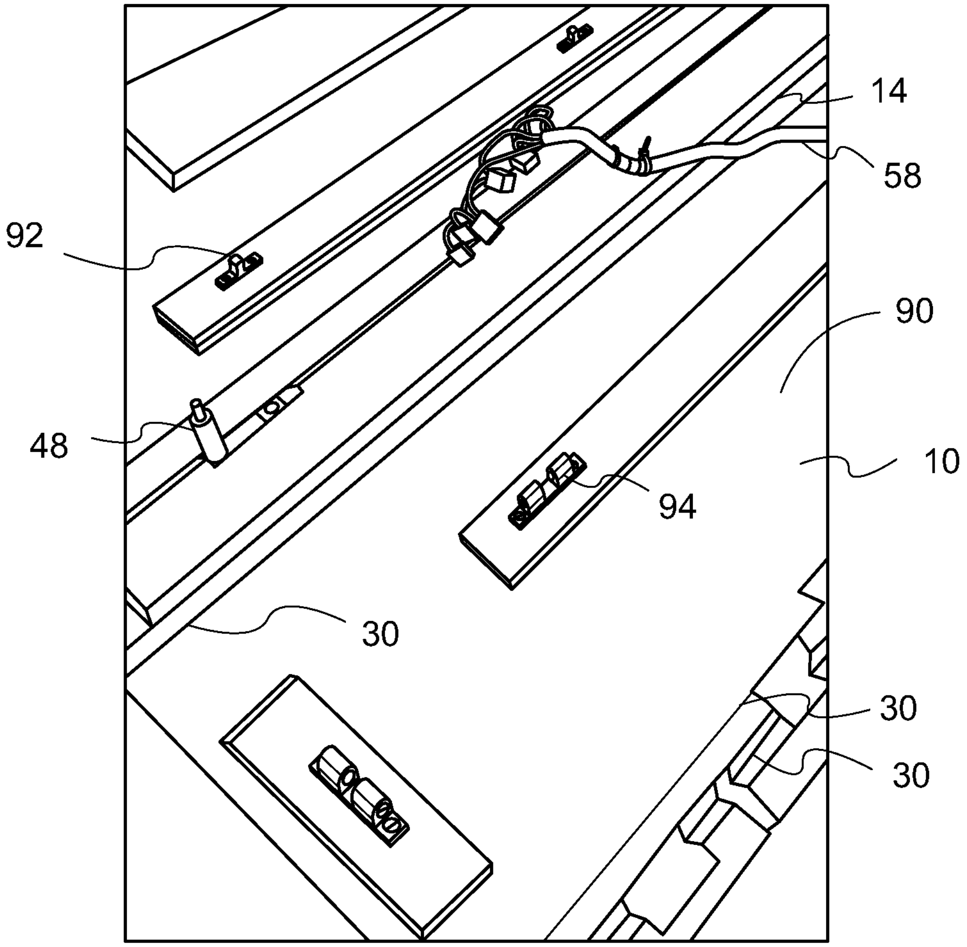
FIG. 12 is a perspective view of an acoustic jacket system comprising an acoustic jacket device and lighting fixture prior to folding the acoustic jacket in accordance with the present disclosure.

FIGS. 12 through 15 show the acoustic jacket 10 and the acoustic jacket system 200, and in particular, the acoustic jacket 10 as it is folded into the finished product. FIG. 12 shows the flat inside surface 90 of the acoustic jacket 10 in the completely unfolded position. The lighting fixture 14 with its power cord 58, is placed onto the inside surface 90 of the acoustic jacket 10. Score lines 30 have been previously made at predetermined locations in order to facilitate the folding of the acoustic jacket 10 into its final form. Additionally, male 92 and female 94 connectors can be placed on different locations on the flat inside surface 90 of the acoustic jacket 10 so that those connectors 92, 94 will be attached and connected when the acoustic jacket 10 is properly folded into shape.

Figure 13:
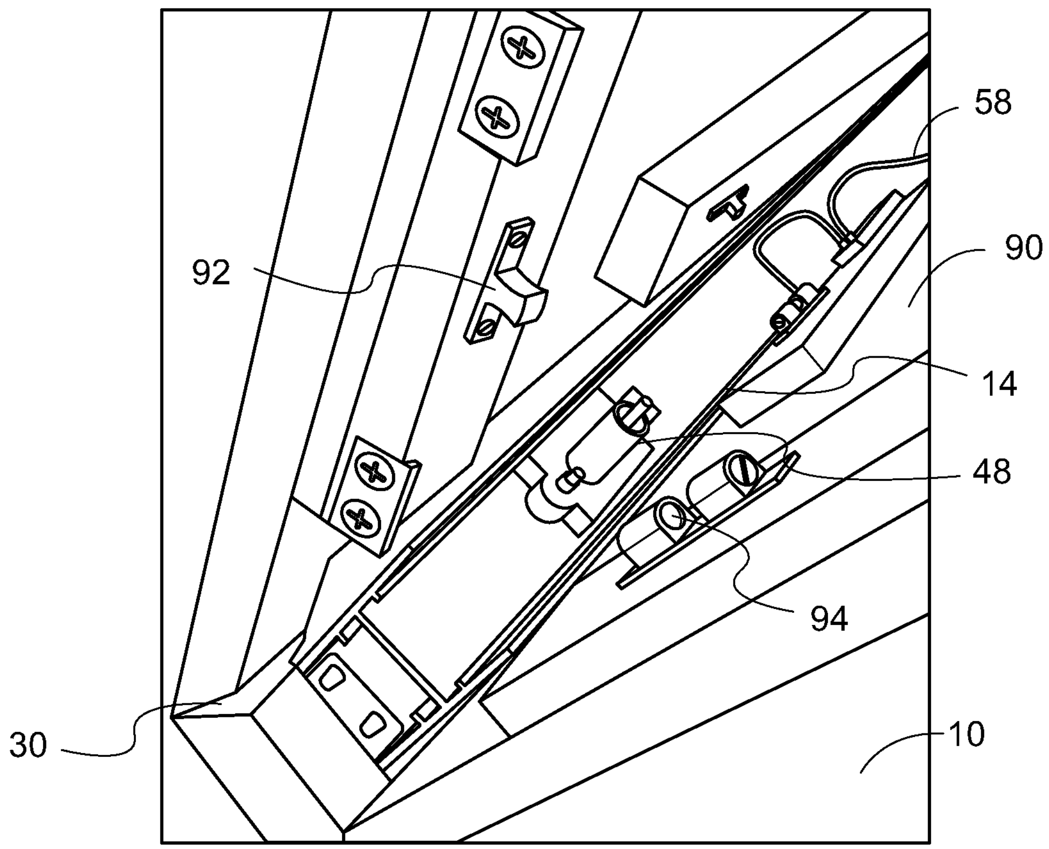
FIG. 13 is a perspective view of an acoustic jacket system comprising an acoustic jacket device and lighting fixture during folding of the acoustic jacket in accordance with the present disclosure.

FIG. 13 shows the acoustic jacket 10 as the folding process begins and the lighting fixture 14 is partially enclosed inside the partially folded acoustic jacket 10. Again, the score lines 30, which have been previously made facilitate the folding of the acoustic jacket 10 into its current form. While the male 92 and female 94 connectors get closer to connecting on the flat inside surface 90 of the acoustic jacket 10.

Figure 14:
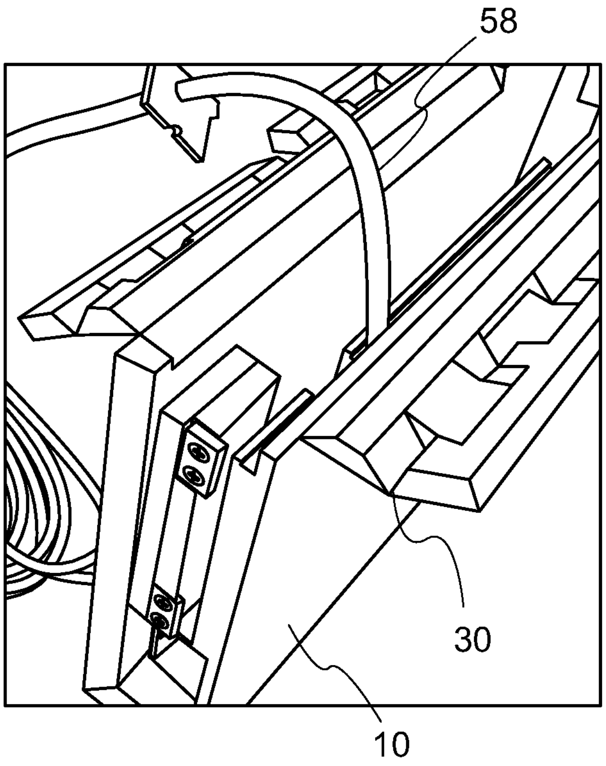
FIG. 14 is a perspective view of an acoustic jacket system comprising an acoustic jacket device and lighting fixture during folding of the acoustic jacket in accordance with the present disclosure.

FIG. 14 shows the acoustic jacket 10 as the folding process continues and the two sides come together, thereby completely enclosing the lighting fixture 14. The remaining score lines 30 are to be used to close the top of the acoustic jacket 10. Although not shown in FIG. 14, the male 92 and female 94 connectors have connected to hold the sides of the acoustic jacket 10 together.

Figure 15:
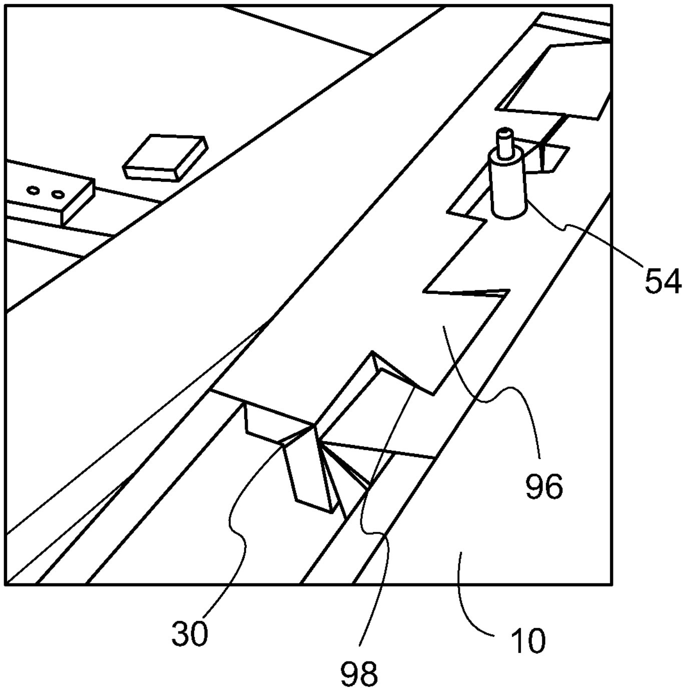
FIG. 15 is a perspective view of an acoustic jacket system comprising an acoustic jacket device and lighting fixture after folding the acoustic jacket in accordance with the present disclosure.

FIG. 15 shows the acoustic jacket 10 as the folding process completes and the top of the acoustic jacket 10 is held together using cut-out male dove tail segments 96 and cut-out female dove tail segments 98. Once interleaved, the acoustic jacket 10 will now hold itself together. In the example in FIG. 15, a cable connector 54 has been used for connecting the acoustic jacket 10 to the suspension cables 12 (not shown). The acoustic jacket 10 is now ready to be attached to the suspension cables 12 and then to be installed over the lighting jacket 10, if that hasn't already been done. The acoustic jacket 10 is now able to be lifted up on the suspension cables 12 and out of the way of the lighting fixture 14 so the lighting fixture 14 can be more easily repaired and/or maintained.

As described herein, numerous different acoustic jacket shapes and designs can be constructed in accordance with the present disclosure. By using a program, such as a computer program, as detailed below, the proper cut and score locations can be calculated to generate the proper lighting fixture 14 cover. Once the dimensions of the lighting fixture 14 are known and/or calculated, the computer program can determine the optimal cut and score design thereby reducing material waste. Once the computer program is converted for use with a CNC machine, the CNC machine can cut each of the pieces necessary for folding or assembling the acoustic jacket 10. As such, using the computer program and a CNC machine, a user can design a jacket device 10 and have the unfolded material cut out and scored in a very short time.

Figure 16:
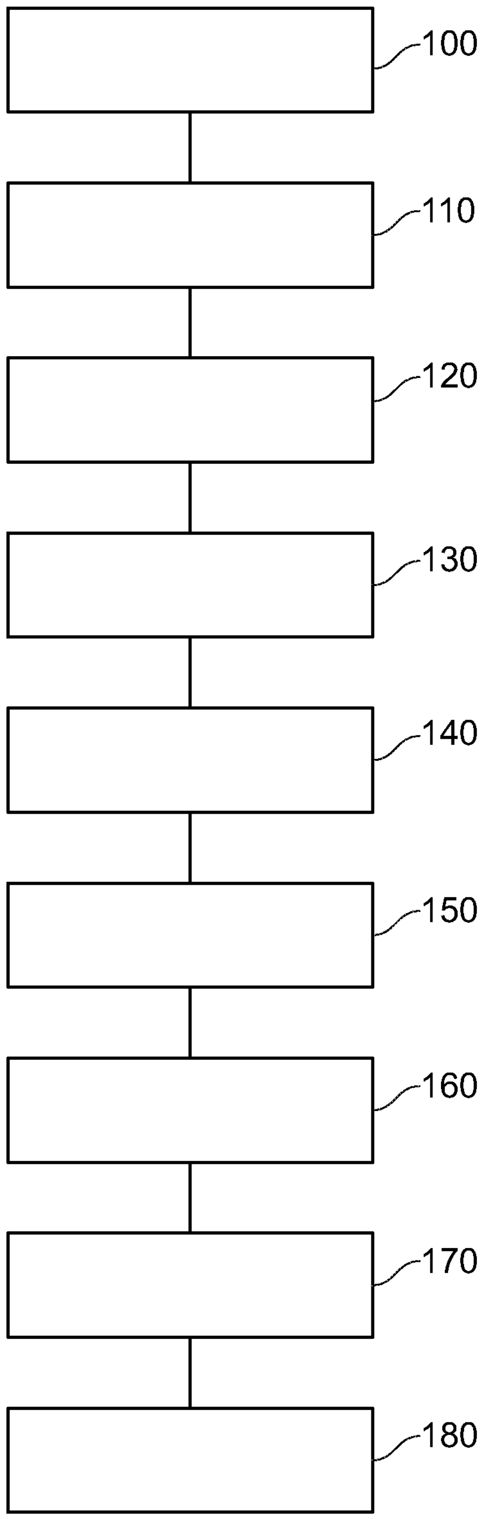
FIG. 16 is a flowchart of a jacket device system in accordance with the present invention.

FIG. 16 shows a flow chart of the computer program used to calculate the cutouts and scoring along with any additional information for the acoustic jacket 10 sent to a CNC machine for optimal cutting and scoring. The computer program starts at step 100, which is the same for all programming functions.

At step 110, the information pertaining to the lighting fixture 14 for the jacket device cover is entered or inputted into the computer system. This can be done in a number of ways as understood by one having ordinary skill in the art, including providing CAD/CAM software so that the user can design an acoustic jacket device 10 based on the lighting fixture 14, entering information about, or scanning, the lighting fixture 14 to obtain the fixture 14 dimensions and entering that information into the system for calculations and determinations.

Once the information has been entered, either by manual input or by scanning, the system calculates cutting and scoring 26 locations in step 120. These locations will be based on the lighting fixture 14 design and will take into account the thickness of the material and possibly the material itself to properly determine the locations of the cuts and scores. Along those lines, at step 130, the computer program will calculate or determine the scoring to be implemented, and the size of the individual scoring or kerfs, including the locations and cutout angles. For example, if the bend of the jacket device is 90 degrees, a particular kerf or cutout can be used, whereas if the bend is 30 degrees a different bend or kerf will be used. Additionally, if the jacket device 10 needs to implement a curvature for a very tight or small radius, the computer program may us larger kerfs, closer together, to allow a small radius curve. Either way the computer system will determine these scoring or kerfs based on the lighting fixture 14 input at step 130.

At step 140, and after the scoring and kerf determination has been completed, the computer program can calculate the cut out angles and locations for the cutting of the preformed holes 32 and preformed cable holes 34 as described above, along with any necessary cuts for an integrated locking device 16 (or to create separate locking devices 16.

Once all of the cuts, kerfs and scoring shapes have been determined from the lighting fixture 14 design, the computer program can optimize a cutting and scoring strategy at step 150 to minimize waste of time and of the material. In doing so, the computer program will shift the different pieces into a location on a board so that the CNC machine will cut out the pieces with the least amount of waste. The computer program will take into account the particular design colors and thicknesses to determine the optimal cutting patterns.

At step 160, the computer program will send the information to the CNC machine for cutting out the pieces. The cut pieces may include the single piece acoustic jacket 10 design, multiple pieces for the design and/or the necessary locking devices 16 to hold the folded design together.

Finally at step 170, the material is cut and scored as necessary. Once the pieces are cut to size, the acoustic jacket device 10 can be folded or assembled. The computer program ends at step 180.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment.

Further, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation given that such combination is not illogical or non-functional. Although numerous embodiments of this invention have been described above with a certain degree of particularity, those skilled in the art could make numerous alterations to the disclosed embodiments without departing from the spirit or scope of this disclosure.

All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the any aspect of the disclosure.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An acoustic jacket for covering a lighting fixture, comprising:

a single piece of material folded along a plurality of folding scores to form a folded acoustic jacket, said folded acoustic jacket defining a first major surface opposing a second major surface, opposing side surfaces extending between the first major surface and the second major surface, and a top surface opposing a bottom surface, the first major surface, second major surface, opposite side surfaces, and top and bottom surfaces defining an enclosed cavity;

at least one locking device holding said folded acoustic jacket in a folded acoustic jacket position;

at least one connection option attached to said folded acoustic jacket and connecting said folded acoustic jacket to a suspension cable, said at least one connection option enabling said acoustic jacket to move up and down said suspension cable;

at least one structural support attached to a lighting fixture at a first end, said structural support attached to the suspension cable at a second end, said at least one structural support preventing said acoustic jacket from moving up and down said suspension cable;

wherein when said folded acoustic jacket is connected to said suspension cable at said at least one connection option, and said lighting fixture is attached to said structural support, and said structural support is attached to said suspension cable, said folded acoustic jacket covers said lighting fixture, said folded acoustic jacket configured to be lifted above and away from said lighting fixture.

2. The folded acoustic jacket of claim 1, wherein said single piece of material comprises PET Felt material.

3. The folded acoustic jacket of claim 1, wherein said at least one locking device comprises PET Felt material.

4. The folded acoustic jacket of claim 1, wherein said at least one locking device is integral with said single piece of material.

5. The folded acoustic jacket of claim 1, wherein said at least one connection option comprises a cable connection option.

6. The folded acoustic jacket of claim 1, wherein said at least one connection option comprises a threaded connection option.

7. The folded acoustic jacket of claim 1, wherein said at least one connection option comprises a PET Felt connection option.

8. The folded acoustic jacket of claim 1, wherein said at least one structural support comprises at least one of a threaded attachment or a cable gripper attachment.

9. The folded acoustic jacket of claim 8, wherein the at least one structural support comprises a threaded attachment comprising a threaded attachment plane, a threaded attachment post, and at least one threaded attachment support.

10. A method of generating a folded acoustic jacket, the steps comprising:

a) folding a single piece of material along a plurality of folding scores to form an acoustic jacket having a plurality of surfaces defining an enclosed cavity;

b) holding said acoustic jacket in a folded configuration using at least one locking device, said at least one locking device configured to hold said single piece of material in a folded acoustic jacket position;

c) attaching said acoustic jacket to a suspension cable using at least one connection option, said at least one connection option enabling said acoustic jacket to move up and down said suspension cable;

d) attaching a lighting fixture to at least one structural support;

e) attaching the at least one structural support to said suspension cable using at least one structural support, said at least one structural support preventing said acoustic jacket from moving up and down said suspension cable;

f) covering said lighting fixture with said acoustic jacket; and g) lifting said acoustic jacket above and away from said lighting fixture wherein the plurality of surfaces includes a top surface opposing a bottom surface having an opening configured to receive a portion of the lighting fixture, a first major surface extending between the top and bottom surfaces, a second major surface opposing the first major surface, and opposing side surfaces extending between the first major surface and the second major surface.

11. The method of generating a folded acoustic jacket of claim 10, wherein said single piece of material comprises PET Felt material.

12. The method of generating a folded acoustic jacket of claim 10, wherein said at least one locking device comprises PET Felt material.

13. The method of generating a folded acoustic jacket of claim 10, wherein said at least one locking device is integral with said single piece of material.

14. The method of generating a folded acoustic jacket of claim 10, wherein said at least one connection option comprises at least one of a cable connection option, a threaded connection option, or a PET Felt connection option.

15. The method of generating a folded acoustic jacket of claim 10, wherein said at least one structural support comprises a threaded attachment comprising a threaded attachment plane, a threaded attachment post, and at least one threaded attachment support.

16. The method of generating a folded acoustic jacket of claim 10, wherein said at least one structural support comprises a cable gripper attachment.

17. An acoustic jacket comprising:

a single piece of material configured to fold along a plurality of folding scores to form an acoustic jacket having a plurality of surfaces defining a cavity, the plurality of surface comprising:

a top surface defining a plurality of openings;

a bottom surface opposing the top surface defining an opening configured to receive a light fixture;

a first major surface extending between the top surface and the bottom surface;

a second major surface opposing the first major surface and extending between the top surface and the bottom surface; and opposing side surfaces extending between the first major surface and the second major surface; and a plurality of locking devices configured to nest in the plurality of openings in the top surface to hold the single piece of material in a folded structure defining the acoustic jacket;

wherein the single piece of material and the plurality of locking devices are comprised of the same material.

18. The acoustic jacket according to claim 17, wherein the single piece of material and the plurality of locking devices are comprised of felt.

19. The acoustic jacket according to claim 17, wherein the surface is defined by a portion of the single sheet of material and top portions of the plurality of locking devices.

20. The acoustic jacket according to claim 17, wherein each of the plurality of locking pieces comprises a top portion and opposing side extensions, each side extension having a first end extending from the top portion and a second opposing end having a beveled edge.

* * * * *